United States Patent [19]

Bonac

[11] Patent Number: 4,646,606
[45] Date of Patent: Mar. 3, 1987

[54] SOCKET TOOTH FOR SAWS

[76] Inventor: Tomo Bonac, 3636 W 30th Avenue, Vancouver, B. C., Canada, V6S 1W8

[21] Appl. No.: 877,140

[22] Filed: Jun. 23, 1986

[51] Int. Cl.[4] .................. B27B 33/12; B23D 61/04
[52] U.S. Cl. ........................... 83/839; 83/844; 83/831; 407/46
[58] Field of Search ............... 83/839, 840, 841, 844, 83/845, 830, 831, 835; 144/2 N; 407/46, 47

[56] References Cited

U.S. PATENT DOCUMENTS

| 540,065 | 5/1895 | Krieger | 83/841 |
| 561,094 | 6/1896 | Dahl et al. | 83/845 |
| 1,653,265 | 12/1927 | Foerster | 83/840 |
| 2,623,553 | 12/1952 | Dawson | 83/845 |
| 2,736,352 | 2/1956 | Wright | 83/844 X |
| 2,994,350 | 8/1961 | Lundberg | 83/845 |

FOREIGN PATENT DOCUMENTS 676448  7/1979  U.S.S.R. .................. 83/845

Primary Examiner—Donald R. Schran

[57] ABSTRACT

A saw tool, especially circular saw, having each saw tooth provided with a tapered male projection to accept a removable, disposable socket tooth; socket tooth comprising a cutting bit and a U-shaped casing permanently joined to each other by brazing or welding. After placing the socket tooth onto the projection by hand the tooth is firmly locked when the cutting forces start to act. The socket tooth is removable by tapping in the direction opposite to placing.

4 Claims, 3 Drawing Figures

SOCKET TOOTH FOR SAWS

The present invention relates to saws with removable teeth.

Most designs of removable saw teeth employ the principle of an inserted tooth secured in an appropriate seat by a spring or an expandable element. These solutions have the serious disadvantage of destabilizing the saw blade due to in-plane stresses introduced by clamping of the insert. To be able to use such blades at all a greater blade thickness must be applied.

Some removable teeth, however, are retained without introducing stresses to the blade. One such solution is described in U.S. Pat. No. 2,623,553 to Dawson. This solution is based on a forked shape of tooth insert anchored onto a tooth body. A disadvantage of this solution is that cutting forces tend to disengage the insert. Also, appropriate shape of the tooth is difficult to produce. Another solution is described in U.S. Pat. No. 2,994,350 to Lundberg. This solution is based on fitting a removable tooth insert into a socket casing permanently mounted onto the tooth. The main disadvantage of this solution is that the inherently weak casing is very difficult to repair when damaged. A solution to this latter problem has been recently marketed as "Clevisaw". Tooth insert is retained using two additional separable elements: a clevis and a pin. The main disadvantage of this arrangement is that the thickness of the clevis has to be substantial and therefore "Clevisaw" cannot be employed in thin-kerf sawing. Another disadvantage of "Clevisaw" is that it requires very tight tolerances when downsized.

The present invention overcomes the foregoing and other drawbacks by permanently joining an elongated cutting bit to a U-shaped, thin, sheet-metal casing into a single, removable socket tooth. To put in place, the socket tooth is pushed onto a fitting male projection of each tooth body. The male projection has four sides of which two opposing surfaces coincide with the blade side surfaces while the other two surfaces are converging in the direction of cutting. No stops or shoulders are employed on saw teeth to convey forces from the socket teeth to the saw blade. Rather, sawing forces, which are oriented principally tangentially to the circular saw, push the socket tooth in the direction of the taper of the male projection and lock the socket tooth by friction. Socket and the male projection are dimensioned to locate the cutting tip of the bit, at tight fit of the socket, frontwardly overhanging the male projection of the saw tooth. To remove the socket tooth, tapping at the end of the bit is applied in the direction opposite to placing.

One advantage of the present invention is the minimal number of parts and the ease of replacement of socket teeth. Further advantage is that the socket teeth are fixed very firmly since the sawing forces act towards the taper of the projection of saw tooth. A still further advantage is that socket teeth can be made very thin because the walls of the U-shaped casing can be made very thin and can be permanently joined to the bit by welding or brazing. Another advantage of the present invention is that the tolerances of either socket tooth or saw tooth male projection are not critical since the socket tooth does not have to fit the projection at a precise location. Still another advantage is the low mass of the socket tooth and its aerodynamic drag which both minimize injury if the socket tooth is accidentally disengaged. A further advantage is also that saw teeth require low maintenance since they are sturdier in comparison to socket teeth which, in case of overloading, fail first.

The invention will now be described further, by way of example only, with reference to the accompanying drawings, in which.

Figure 1:
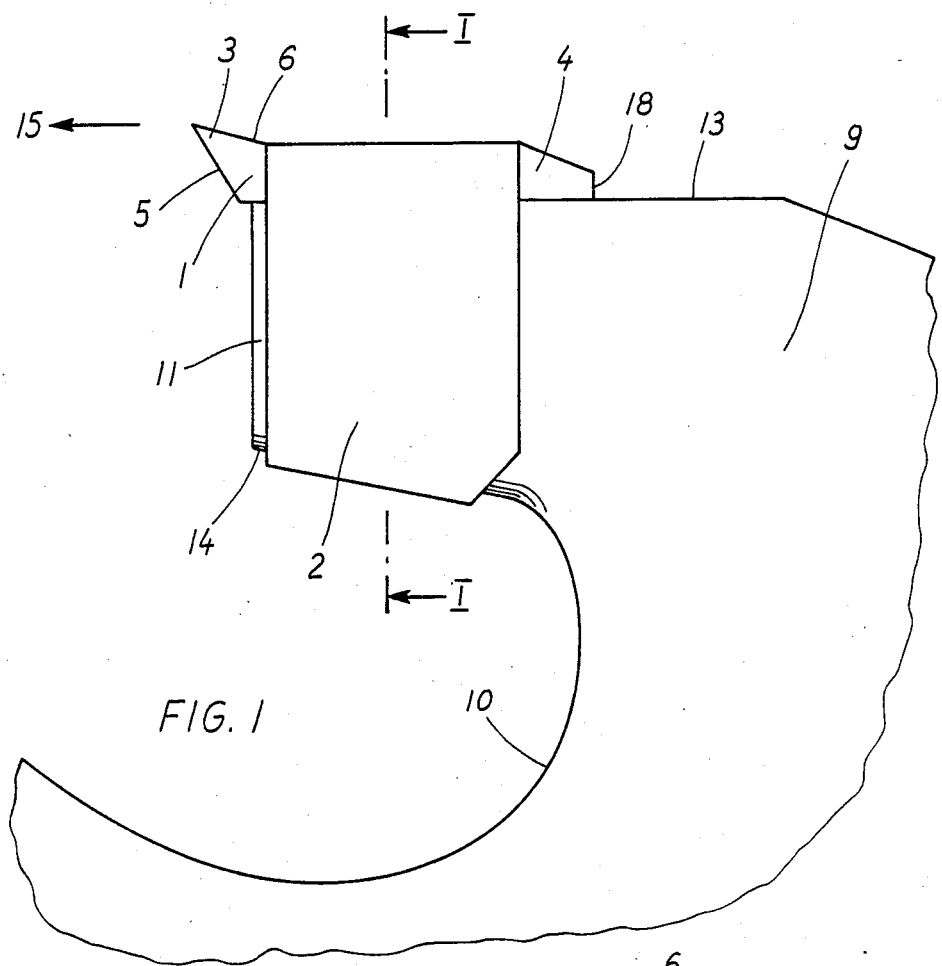
FIG. 1 is a side elevational view of a section of a sawing tool according to the invention.
Figure 2:
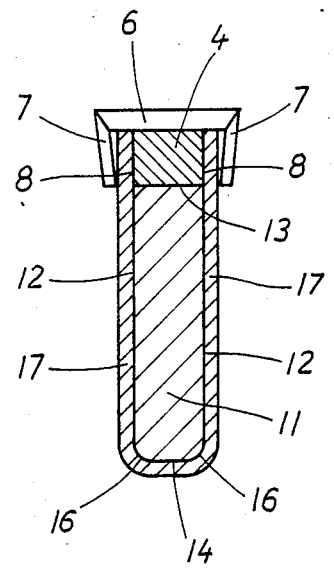
FIG. 2 is the same embodiment in section on line I—I of FIG. 1.

According to FIGS. 1 and 2 a removable socket tooth consists of cutting bit 1 and U-shaped casing 2. The bit engages in cutting at tip 3 formed by rake face 5, clearance face 6 and two side faces 7. Cutting bit also has shank 4 which is permanently secured to casing 2 by brazing or welding joints 8. Saw tooth 9, which has gullet 10 to collect sawdust, is frontwardly shaped into a male projection 11 which accepts socket tooth by a slide fit. Projection 11 has two side surfaces 12 which, in the prefered embodiment, are in the same plane as the two side surfaces of the blade and another two surfaces 13 and 14 which converge toward one another in the direction of cutting 15. Surface 13 coincides with the cutting direction 15, which is tangential in the case of a circular saw. Placing the socket tooth on the projection 11 can be done by hand since a low friction fit is designed in the preferred embodiment. Low friction is achieved by slight deforming the opposite casing walls 17 by compressing them toward each other approximately in the middle between surfaces 13 and 14. When sawing, forces act on the rake face 5 in the direction opposite to 15 and lock the socket tooth firmly by friction on the taper defined by surfaces 13 and 14. The two edges formed by surfaces 12 and 14 are deburred to a radius 16 to reduce shear stresses acting at U-bend of casing 2. Socket tooth is removed by tapping at the end 18 of the cutting bit in the direction 15.

Figure 3:
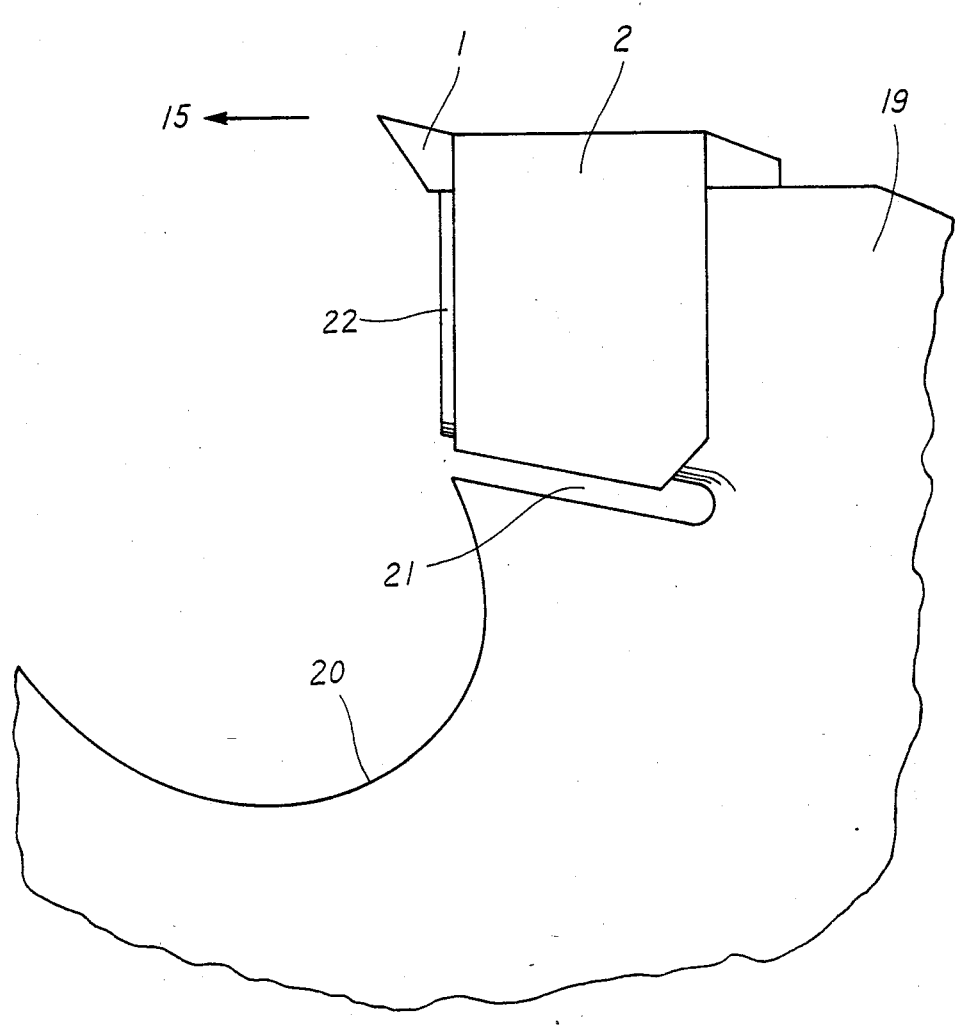
FIG. 3 shows the same socket tooth as shown in FIG. 1 mounted on a tooth body having an alternative shape.

FIG. 3 shows conventional saw tooth 19 with gullet 20 modified to accept a socket tooth. Male projection is provided by cutting slot 21 into saw tooth. Male projection 22 has the same geometry as male projection 11 shown in FIGS. 1 and 2.

I claim:

1. A saw tool for making a saw cut, the saw tool comprising:
    a blade with plurality of saw teeth distributed in spaced relation with one another along the periphery of the blade, each saw tooth provided with a male projection defined by two surfaces parallel to each other and to the blade plane and by another two surfaces converging toward one another in the direction of cutting; a socket tooth removably mounted on the male projection of each saw tooth, each socket tooth comprising an elongated bit and a U-shaped casing, the bit having a shank and a tip provided with cutting edges, the shank permanently joined to the casing to establish four inner surfaces coinciding with the four surfaces of the male projection in such spaced relationship that said tip of the bit overhangs the end of said male projection.

2. The saw tool of claim 1 wherein one of the converging surfaces of the male projection coincides with the cutting direction.

3. The saw tool of claim 1 wherein the edges of said male projection at intersections of the said two surfaces parallel to each other and the converging surface, which is next to periphery of the blade, are substantially deburred.

4. The saw tool of claims 1,2 or 3 wherein said casing is joined to said shank by brazing or welding.